(12) United States Patent
Neubauer et al.

(10) Patent No.: US 8,800,778 B2
(45) Date of Patent: Aug. 12, 2014

(54) SUSPENSION SOLUTION FILTER SIEVE BASKET FOR USE IN FLUE GAS DESULPHURIZATION

(75) Inventors: Georg Neubauer, Dallgow-Doeberitz (DE); Jakob Wilhelm, Neuruppin (DE); Detlef Weber, Essen (DE)

(73) Assignee: REA Plastik Tech GmbH, Neuruppin (DE)

( * ) Notice: Subject to any disclaimer, the term of this patent is extended or adjusted under 35 U.S.C. 154(b) by 79 days.

(21) Appl. No.: 13/496,890

(22) PCT Filed: Sep. 20, 2010

(86) PCT No.: PCT/EP2010/063781
§ 371 (c)(1),
(2), (4) Date: Mar. 19, 2012

(87) PCT Pub. No.: WO2011/033101
PCT Pub. Date: Mar. 24, 2011

(65) Prior Publication Data
US 2012/0183446 A1    Jul. 19, 2012

(30) Foreign Application Priority Data
Sep. 21, 2009   (DE) .................... 20 2009 012 640 U

(51) Int. Cl.
*B07B 1/06* (2006.01)
*B01D 29/03* (2006.01)
*B01D 29/33* (2006.01)

(52) U.S. Cl.
CPC .......... *B01D 29/33* (2013.01); *B01D 2251/404* (2013.01); *B01D 29/035* (2013.01); *B01D 2259/80* (2013.01); *B01D 2201/184* (2013.01); *B01D 2257/302* (2013.01)
USPC ........................... 209/274; 209/391; 209/397

(58) Field of Classification Search
USPC ..................... 209/274, 391, 397, 400, 931
See application file for complete search history.

(56) References Cited

U.S. PATENT DOCUMENTS

| | | | | |
|---|---|---|---|---|
| 4,717,471 A * | 1/1988 | Winkler | ........................ | 209/273 |
| 5,407,563 A * | 4/1995 | Blake | ............................ | 210/155 |
| 6,165,323 A | 12/2000 | Shearer | | |
| 7,799,173 B2 * | 9/2010 | Sheerer et al. | ................ | 162/246 |
| 2009/0188840 A1 | 7/2009 | Ansperger | | |

FOREIGN PATENT DOCUMENTS

| | | |
|---|---|---|
| DE | 628 980 C | 4/1936 |
| DE | 41 07 432 A1 | 9/1992 |
| GB | 2 287 200 A | 9/1995 |

* cited by examiner

*Primary Examiner* — Michael McCullough
(74) *Attorney, Agent, or Firm* — Norman B. Thot

(57) ABSTRACT

A suspension solution filter sieve basket for use in a flue gas desulfurization includes holes which widen in a flow direction of a suspension solution.

10 Claims, 5 Drawing Sheets

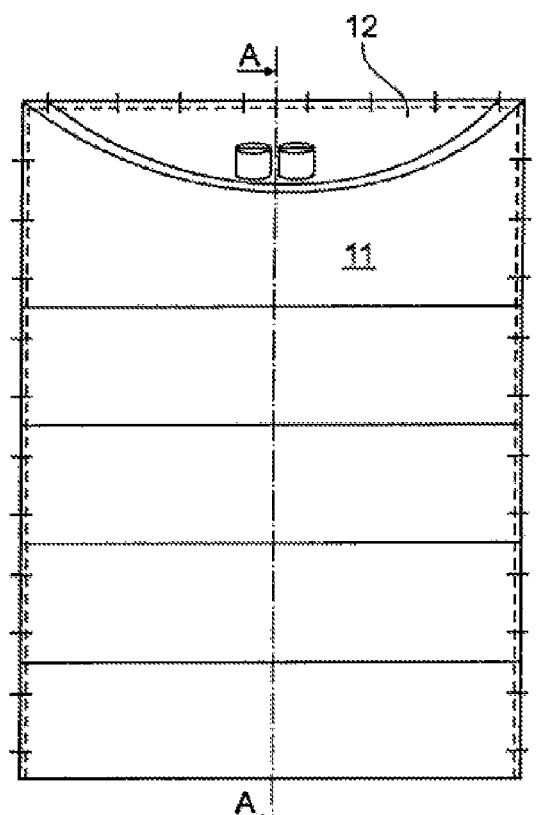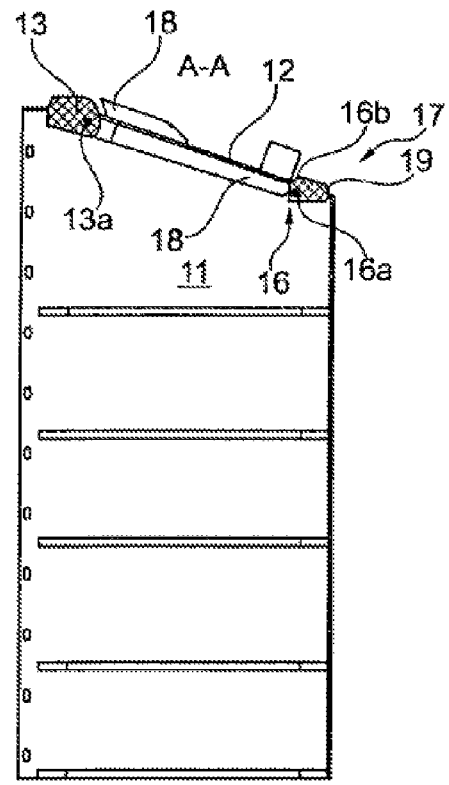
Fig. 7      Fig. 8
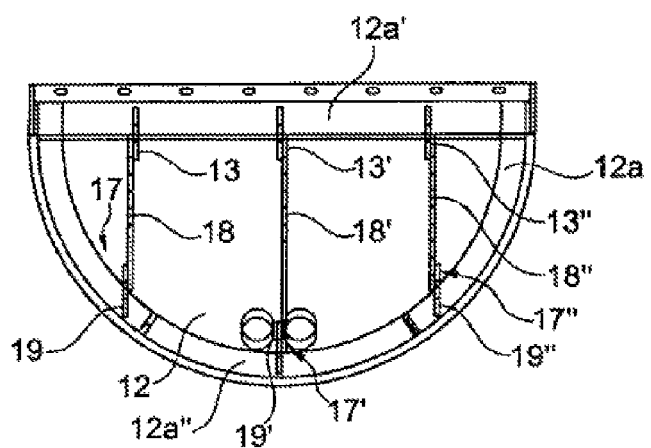
Fig. 9

SUSPENSION SOLUTION FILTER SIEVE BASKET FOR USE IN FLUE GAS DESULPHURIZATION

CROSS REFERENCE TO PRIOR APPLICATIONS

This application is a U.S. National Phase application under 35 U.S.C. §371 of International Application No. PCT/EP2010/063781, filed on Sep. 20, 2010 and which claims benefit to German Patent Application No. 20 2009 012 640, filed on Sep. 21, 2009. The International Application was published in German on Mar. 24, 2011 as WO 2011/033101 A1 under PCT Article 21(2).

FIELD

The present invention provides a suspension solution filter sieve baskets for use in flue gas desulfurization ("FGD") of large power stations and to a method for production thereof.

BACKGROUND

The FGD of a coal, oil or lignite power station separates $SO_2$ produced in the combustion process, and prevents $SO_3$, that is to say, sulfuric acid, from being formed in the atmosphere from this $SO_2$. This is because this sulfuric acid rains down and acidifies soils (acid rain) and has been partly responsible for the death of forests in many areas of Europe.

The chemical process in FGD binds $SO_2$ with limestone or other reagents to form gypsum. In this case, many different chemical reactions occur, in which a whole series of substances may participate, which are typically an integral part of the flue gas or have been introduced into the process together with the FGD reagent, usually limestone. These include fly ash, chlorides, fluorides, minerals, etc.

Experience gained from the FGD process in a large power station shows that caked-on deposits are repeatedly formed on the walls and on the internal components (pipelines, nozzles, beams, etc.) of FGD. These caked-on deposits are partly the result of the oxidation process of the $SO_2$ and partly the result of chemical processes of the other constituents of the flue gas and the limestone. These deposits often arise from chemical crystallization processes and are therefore very hard and rigid. They often have the hardness and consistency of clay or porcelain fragments and frequently also their appearance.

These caked-on deposits may easily come loose from the substrate during operation. This loosening is caused by temperature fluctuations (thermal expansion and contraction break up the deposits and loosen them) or mechanical forces, such as vibration or pressure pulses. These caked-on deposits then fall into the scrubber sump. They have various sizes with a diameter of 10 mm to 1000 mm.

These caked-on fragments and solids can have a considerable harmful effect in the FGD process. They may damage FGD components, they may lead to accelerated wear, or they may disrupt the process considerably due to blockages.

The following are examples of typical damage and disruptions:

1. Damage to the Pump
   In the case of rubber-lined recirculation pumps, these hard caked-on fragments, sometimes even having sharp edges, may damage the rubber lining and consequently cause corrosion on the pump body.
2. Abrasion on the Recirculation Lines
   The inner layer of the recirculation line, whether rubber lining, GFRP or polypropylene, is ground and worn down by these large and hard bodies when the suspension liquid flows upward to the spraying level.
3. Blockage of Spraying Levels and Spray Nozzles
   The large pieces collect at the spraying levels to form larger heaps. They flow more slowly than the suspension liquid. When a sufficient number of large parts comes together, this may easily lead to a situation where the nozzle pipe is blocked at a narrower point or where the parts in the spray nozzle come to a stop and block it.
4. Abrasion at the Spraying Levels
   These caked-on fragments are thrown by the spray nozzles onto the spraying levels lying underneath and cause abrasion and damage when they impinge onto the surface.
5. Gypsum Dewatering
   In the gypsum dewatering process, these parts may likewise cause disruptions and problems.

It is therefore in the interests of power stations to keep the larger of these caked-on fragments in the FGD sump and to avoid a situation where these fragments infiltrate into other structural parts and cause damage or disruption there.

This is the object of suspension solution filter sieve baskets which are installed upstream of the pumps and upstream of the outlets for gypsum dewatering. These suspension solution filter sieve baskets keep the large solid parts in the FGD sump and avoid the situation where they penetrate into the other process steps and there cause the damage described.

These suspension solution filter sieve baskets are conventionally manufactured with holes of 20 mm to 25 mm so as to retain all parts which have an equal or larger diameter.

These sieves were first manufactured from high-grade steels. This, on the one hand, had the effect that the procurement and installation of these suspension solution filter sieve baskets became a highly cost-intensive investment. On the other hand, it was found that high-grade steel is suitable for only a very limited extent for this caking-on.

Severe corrosion of these suspension solution filter sieve baskets therefore repeatedly occurred, and the suspension solution filter sieve baskets had to be exchanged. Increasingly higher-alloyed steels had to be used in order to avoid this corrosion (which naturally made the costs even higher).

On the other hand, it was found that caked-on deposits were also formed on the steel. The suspension solution filter sieve baskets regularly grew in size over time. The pressure loss rose and the sieves had to be cleaned offline.

Sieves made from GFRP were also used. Here it was also found that the function was restricted. On the one hand, damage to the GFRP repeatedly occurred, which then led to GFRP corrosion (loosening of the glass fibers from the resin), and on the other hand breakage damage repeatedly occurred due to large caked-on deposits falling down and the rapid pressure changes when the pumps were switched on and off. It became apparent that GFRP was a material unsuitable for this application.

Thermoplastics, such as polypropylene, proved to be the most suitable for this application. On the one hand, thermoplastics are corrosion-free even in this environment, and on the other hand, the suspension solution filter sieve baskets made from thermoplastic proved to be robust and unsusceptible to contamination. There was neither damage, as in the case of GFRP, nor did massive caked-on deposits occur, as in the case of high-grade steel. The majority of all new FGD has since been equipped with suspension solution filter sieve baskets made from polypropylene.

At the temperatures prevailing in the FGD sump, polypropylene is relatively soft and has only limited stability. The suspension solution filter sieve basket therefore must be produced from a relatively thick material (20 mm polypropylene board) and additionally has to be stiffened with ribs.

It nevertheless happens repeatedly that suspension solution filter sieve baskets are damaged during operation. This damage is usually caused by the fact that caked-on fragments are trapped in the holes of the suspension solution filter sieve basket and remain stuck in. The pipe is then largely or completely blocked. When a large number of holes is blocked, the pressure loss rises, and increasingly the pump suction force is led to the body of the suspension solution filter sieve basket. This then at some point leads to the deformation of the suspension solution filter sieve basket, to the point of its destruction.

Power stations naturally keep an eye on the operation of the suspension solution filter sieve baskets and try to recognize imminent damage and prevent this in advance. The current consumption of the pumps or the pressure loss of the pump is measured. When current consumption rises or the pressure loss conditions change, this indicates that a large proportion of the holes in the suspension solution filter sieve basket are blocked.

Internal online washing systems were experimented with. It became apparent, however, that these cleaning mechanisms can be used to only a very restricted extent underwater. Another method was therefore adopted: these suspension solution filter sieve baskets are flushed free by "backflush". The pump is stopped and the liquid in the recirculation lines is not discharged via the dewatering outflow, but instead is allowed to flow back into the sump again via the suspension solution filter sieve basket. This backflow through the suspension solution filter sieve basket frees the suspension solution filter sieve basket of caked-on parts which are stuck in the holes of the suspension solution filter sieve basket or even only lie against the holes and are held there by the suction force. A flap or sieve basket cover in the suspension solution filter sieve basket prevents the falling pressure of the up to 25 m high liquid column in the recirculation line from throwing the suspension solution filter sieve basket out of its fastening.

It was also found, however, that this backflush helps to only a limited extent. Only part of the caked-on deposits stuck in the holes is removed. Another part of the caked-on deposits which increases in size over time remains stuck in the holes of the suspension solution filter sieve basket and must be removed manually during inspection.

An analysis of such caked-on fragments stuck firmly in suspension solution filter sieve baskets showed that this has something to do with the configuration of the holes or with the manufacturing process. These holes have hitherto been drilled out by means of drills. Cylindrical holes were therefore obtained.

An exact analysis of the manufacturing technique shows, however, that this manufacturing method has a considerable disadvantage with regard to the problem of contamination. To be precise, after the drilling of the holes, the board has to be bent into a semicircle which then forms the typical shape of the suspension solution filter sieve basket. The semicircle is important so as to give the relatively soft material the static strength to withstand the forces of the pump without deformation in the event of contamination.

It is known, then, that shaping a board into a semicircle causes deformation of the material. The outer side of the board is expanded and the inner side of the semicircle is compressed. This means, for the conical hole obtained by drilling, that it has then assumed a conical shape. The diameter on the outside of the suspension solution filter sieve basket has been widened and the diameter on the inside of the suspension solution filter sieve basket has been compressed, that is to say reduced. Moreover, the hole is no longer round.

This shape of the hole is disadvantageous for the intended use. This conical shape of the hole means, then, that solids can penetrate into the hole with the liquid stream because they are somewhat smaller than the outer inlet, but they can no longer leave the hole inwardly because the solid is too large.

This situation is made even worse in that the surface in the hole has become rough and irregular due to production (drilling or milling). This irregularity has even been intensified by bending.

It may be that this problem seems minor. It appears somewhat unlikely at first sight that the solids always have exactly the size of the hole.

Three factors must, however, be taken into account:

1. 8,000-16,000 Hours of Operation

The power station should ideally operate for 8,000 to 16,000 hours without disruption and interruption, and many thousand cubic meters are drawn through the suspension solution filter sieve basket every hour. Over this long period of time, it is not unexpected that a relatively large number of solids appear in exactly the correct size.

2. Agitator Mechanisms

The sump is permanently kept in motion via agitator mechanisms in order to prevent suspended substances from settling and solidifying and in order to improve the oxidation of the $SO_2$. New solids are therefore constantly carried to the suspension solution filter sieve baskets.

3. Growth and Abrasion

During this constant motion, the shape and size of the solids also change. On the one hand, the size is reduced by abrasion and collision and, on the other hand, the solids constantly grow in size on account of the oxidation processes.

The sieves become increasingly blocked over time. By the "backflush" described above, blockage can be repeatedly reduced, but to a lesser extent over time. Blockages therefore occur which cannot be eliminated by means of the "backflush".

These are usually solids stuck in the holes which have not been able to be washed out of the suspension solution filter sieve basket by the final "backflush" (emptying of the recirculation lines during rundown).

The problem is aggravated in that the solids which are stuck in the holes begin to grow as a result of chemical crystallization processes. The slow growth observed in the metallic suspension solution filter sieve baskets occurs in an only very minor form in the case of the thermoplastic suspension solution filter sieve baskets. However, a growth of the holes may nevertheless occur when a solid is stuck firmly in the hole and grows in size.

SUMMARY

An aspect of the present invention is to provide a suspension solution filter sieve basket and flue gas desulfurization which are especially safe against blockage and destruction. The recirculation lines, pumps, spraying levels, spray nozzles and gypsum dewatering components are, for example, to be kept free of large solids and the disruptions and damage occurring as a result thereof are to be avoided. A further aspect of the present invention is to provide a method for producing an improved suspension solution filter sieve basket.

In an embodiment, the present invention provides a suspension solution filter sieve basket for use in a flue gas desulfurization which includes holes which widen in a flow direction of a suspension solution. In an embodiment, the present invention also provides a method for producing a suspension solution filter sieve basket for use in a flue gas desulfurization. The suspension solution filter sieve basket includes a semicircular region or a semi-oval region having holes which widen in a flow direction of a suspension solution. The method includes first introducing the holes, and then bending so as to obtain a round or a semicircular shape of the semicircular region or of the semi-oval region, so that, after the bending, the holes still have a shape which continuously widen from an outside to an inside.

BRIEF DESCRIPTION OF THE DRAWINGS

The present invention is described in greater detail below on the basis of embodiments and of the drawings in which:

FIG. 7 shows a front view of a suspension solution filter sieve basket in the embodiment according to FIG. 5;

FIG. 8 shows an illustration of a cross section along the line A-A in FIG. 7;

FIG. 9 shows a top view of a suspension solution filter sieve basket, as in FIG. 7.

DETAILED DESCRIPTION

Figure 1:
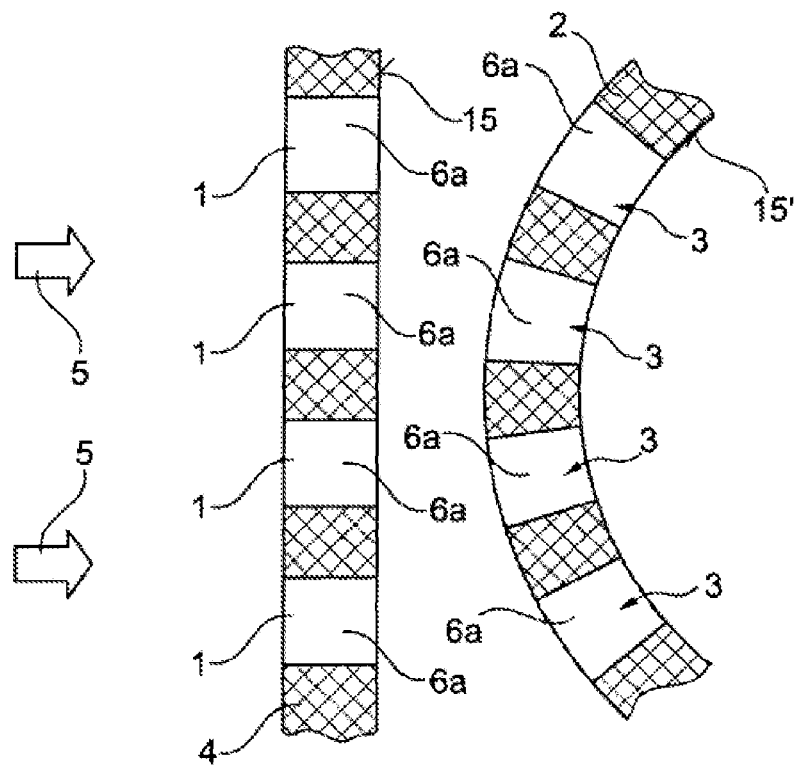
FIG. 1 shows on the left a sectional illustration of a board known from the prior art in the non-bent state with cylindrical holes, and on the right an illustration of this board in the bent state.

The suspension solution filter sieve basket according to the present invention for use in flue gas desulfurizations has holes through which the suspension solution can flow, but solids beyond a specific size are retained. The holes continuously widen from the outside inward. The term "outside" designates in this context the side facing the flow of suspension solution. The term "inside" correspondingly designates in this context the side facing away from the flow of the suspension solution.

This shape of the holes (widening from the outside inward) leads to a situation where a solid either cannot penetrate into the hole at all (too large) or, on account of the inward widening, can also leave the hole reliably again if it could ever penetrate through the outer hole cross section.

This considerably reduces the risk that solids settle in the hole. They now either remain caught on the hole on the outside and are held by the suction force of the pump or they can reliably leave the hole again inwardly. The blockages which then still occur on the outside of the suspension solution filter sieve basket can be removed again relatively reliably by means of the "backflush".

In an embodiment of the present invention, the holes can, for example, have a circular cross section. In this embodiment, their shape is therefore frustoconical, in other words, conical, and the outer hole diameter is smaller than the inner hole diameter.

In an embodiment of the present invention, the suspension solution filter sieve basket can, for example, have a region with a semicircular or a semi-oval shape. The holes can, for example, be arranged in this region. The region may comprise the entire suspension solution filter sieve basket.

In an embodiment of the present invention, a semi-circularly or a semi-ovally bent board can, for example, be provided, in which the holes are arranged.

The board can, for example, have a wall thicknesses of about 15 to 20 mm.

In an embodiment of the present invention, the suspension solution filter sieve basket can, for example, comprise a plastic, for example, a thermoplastic material and, for example, polypropylene.

The aspect according to the present invention is achieved, in terms of the method, in that the round or semicircular shape of the semicircular or semi-oval region of the suspension solution filter sieve basket is generated by bending, and, during the production of the suspension solution filter sieve basket, the holes are introduced before bending, such that, even after bending, they still have a shape widening continuously from the outside inward. The holes are therefore executed so as to widen from the front, but with the widened cross section on the side which will face away from the flow when the suspension solution filter sieve basket is mounted, that is to say the subsequent inside and the narrower cross section on that side which will face the flow when the suspension solution filter sieve basket is mounted, that is to say the subsequent outside of the suspension solution filter sieve basket. The round or semicircular shape of the region of the suspension solution filter sieve basket is subsequently generated by bending. The widening shape of the holes is pronounced to an extent such that, even after bending, the holes still have a shape widening pronouncedly from the outside inward.

Bending leads to a situation where the outer hole cross section is widened and the inner hole cross section is reduced. The widening shape of the hole before bending therefore compensates and overcompensates the deformation occurring as a result of bending.

In an embodiment of the present invention, holes with a circular cross section, that is to say, conical holes, can, for example, be introduced. The outer hole diameter is in this case smaller than the inner hole diameter.

The holes can, for example, be drilled. They may also be introduced in another way.

In spite of this improved configuration with conical holes, however, blockages may still occur which cannot be cleaned by backflush during operation.

There are many reasons for this, such as chemical reactions which cause the holes to be clogged slowly, a particularly large number of solids which fill the entire sump of the FGD, etc. In these cases, the backflush from the pump no longer leads to the required cleaning result.

Two risks arise in this case:
1. Damage to the Suspension Solution Filter Sieve Basket
   If the suction forces of the pump applied to the suspension solution filter sieve basket become too high, the walls will at some point give way and massive deformation of the suspension solution filter sieve basket occurs—total damage.

2. Cavitation in the Pump

The pump has to operate against too high a pressure loss and this at some point leads to cavitation which may cause considerable damage in the pump.

Both types of damage should be avoided. However, it happens repeatedly that power stations do not notice the problem for whatever reason or FGD must continue to operate, despite the problem being recognized, for overriding reasons.

The aspect according to the present invention is also achieved in that a predetermined breaking point on the suspension solution filter sieve basket is provided, which, when a suction load of the pump on the sieve body is exceeded, "breaks" and consequently causes a relief of the sieve basket body of the forces, for example, of the suction load of the pump.

The term "breaking" also means nondestructive release within the scope of this publication.

In an embodiment of the present invention, the predetermined breaking point functions, for example, as an emergency safeguard. It can, for example, have the effect that the above-described overload of the suspension solution filter sieve basket and of the pump can arise only as far as a specific point. When this load point is reached and exceeded, the predetermined breaking point in the embodiment then "breaks" and the situation is relieved.

In an embodiment of the present invention, the suspension solution filter sieve basket can, for example, have a sieve basket cover. In this embodiment, the sieve basket cover is arranged on the upper side of the suspension solution filter sieve basket. The predetermined breaking point can, for example, give rise, after breaking, to an at least partial opening of at least parts of the sieve basket cover. As a result of the breaking of the predetermined breaking point, the entire sieve basket cover can, for example, open, for example, open completely.

In an embodiment of the present invention, the sieve basket cover can, for example, be configured such that it opens abruptly when the maximum load point is reached.

In an embodiment of the present invention, even after opening has taken place on account of the breakage of the predetermined breaking point, the sieve basket cover can, for example, remain connected to the suspension solution filter sieve basket so that it cannot be sucked into the pump.

In an embodiment of the present invention, after the breakage of the predetermined breaking point, the suspension solution filter sieve basket can, for example, be put back into the initial state in a simple way. At most, therefore, damage repairable in a simple way is, for example, caused by the breakage of the predetermined breaking point.

If, when the predetermined breaking load is reached, the sieve basket cover comes loose completely and is therefore sucked entirely or in pieces into the pump, serious damage to the pump must be expected or the pump will fail. So that the breakage of the predetermined breaking point causes at most damage repairable in a simple way, on the one hand, the breakage of the predetermined breaking point can, for example, take place such that the sieve basket cover is drawn into the interior of the suspension solution filter sieve basket (with the result that the area previously covered by the sieve basket cover is then available for the liquid stream), but, on the other hand, the sieve basket cover cannot, for example, penetrate into the suction connection piece of the pump.

On the other hand, the predetermined breaking point itself can, for example, be put back into the initial state again and/or repaired with the least possible outlay in terms of time and cost. If complicated repair were to be necessary after the breakage of the predetermined breaking point, its purpose would be nullified.

The breakage of the predetermined breaking point also presents problems for reasons other than the costs of restoring the initial state of the suspension solution filter sieve basket. The suspension solution filter sieve basket naturally has the function of protecting the pump, pipelines and spray nozzles from blockage and from damage and of keeping $SO_2$ separation efficient. If, then, the sieve basket cover of the suspension solution filter sieve basket breaks at the predetermined breaking point, the suspension liquid then flows, unfiltered, to the pump. This is then no longer avoidable.

Even in this situation, however, there is still greater operational reliability than during operation without a suspension solution filter sieve basket (or with a destroyed suspension solution filter sieve basket). Larger solids are of course more likely to be found in the lower part of the sump because of their weight. Since, in an embodiment, the sieve basket cover is installed on the upper side of the suspension solution filter sieve basket, the suspension solution filter sieve basket still acts in the same way as a grid which retains the mass of the solids. Only a small part of probably somewhat small solids will then find its way into the pump. This, although being negative, cannot be avoided entirely.

In an embodiment of the present invention, the sieve basket cover can, for example, be equipped with two holding connections, where the weaker connection serves as a predetermined breaking point. The predetermined breaking point breaks when a specific shear stress is reached and consequently relieves the suspension solution filter sieve basket of the suction load of the pump. The sieve basket cover can, for example, be composed of two parts, respectively, of a cover and of a cover margin which can, for example, be connected to one another via ribs. These ribs can be connected to one another by means of two holding mechanisms or holding connections, for example, a holding rod which, for example, forms the axis of rotation of a joint, and a support which comprises a breaking bolt. The breaking bolt can, for example, comprise a screw, for example, a screw made from polypropylene (PP). The breaking bolt in this case constitutes the weakest member. When the flue gas desulfurization device is in operation, the breaking bolt is subjected to shear stress and is sheared off whenever this shear stress overshoots a maximum load. Since at least one further breaking bolt is capable of being used, the load at which the predetermined breaking point breaks can, for example, be adjusted. The other connection, which connects the sieve basket cover to the suspension solution filter sieve basket even after the breakage of the predetermined breaking point, is designed as a markedly more stable structure, for example, reinforced with a steel insert.

In an embodiment of the present invention, the sieve basket body can, for example, be equipped with a support on which the sieve basket cover rests, and this support is configured such that, when a specific load is reached, this support is sheared off and the suspension solution filter sieve basket is relieved of the suction load of the pump.

The support can, for example, comprise breaking bolts which are designed, for example, as PP screws. These are, however, here installed in the sieve basket body and the sieve basket body lies on them, with the result that they can, for example, be subjected to shearing stress. Whenever the load becomes too high, the breaking bolts shear off at some point. The sieve basket cover thereupon swings into the suspension solution filter sieve basket and remains caught in the lee of the flow.

The present invention also comprises a flue gas desulfurization device with a sump with suspension solution, with at least one recirculation line, with at least one recirculation pump, with spray nozzles, in which at least one suspension solution filter sieve basket having the features as claimed herein is provided upstream of the recirculation line in the direction of flow of the suspension solution.

In an embodiment of the present invention, the flue gas desulfurization device can, for example, also comprise gypsum dewatering, and a suspension solution filter sieve basket having the features as claimed herein can, for example, also be provided upstream of the gypsum dewatering process.

The suspension solution filter sieve basket comprises a board 2 made from polypropylene, which is bent into a semicircle or semi-oval. The board has a wall thickness of about 15-20 mm. Holes 6a are introduced into the board 2.

Figure 2:
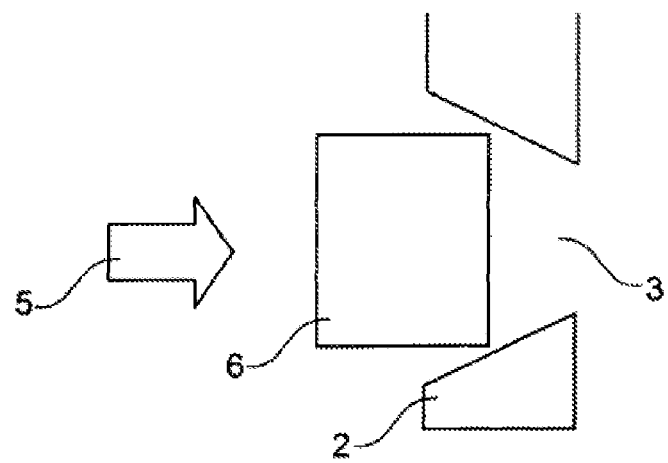
FIG. 2 shows the sticking of a solid in holes of a board, as shown on the right in FIG. 1.

FIG. 1 shows the generation of the conical holes in boards of suspension solution filter sieve baskets which are known in the prior art. As may be gathered from the left illustration in FIG. 1, these holes 1 are initially cylindrical. Their conical shape occurs only as a result of bending. These holes 3 taper toward the inside 15' of the suspension solution filter sieve basket. FIG. 2 illustrates the problem of such conical holes 3. A solid 6 can be seen which is stuck in such a conical hole 3. The arrow 5 in FIG. 2 symbolizes the direction of flow of the suspension solution.

Figure 3:
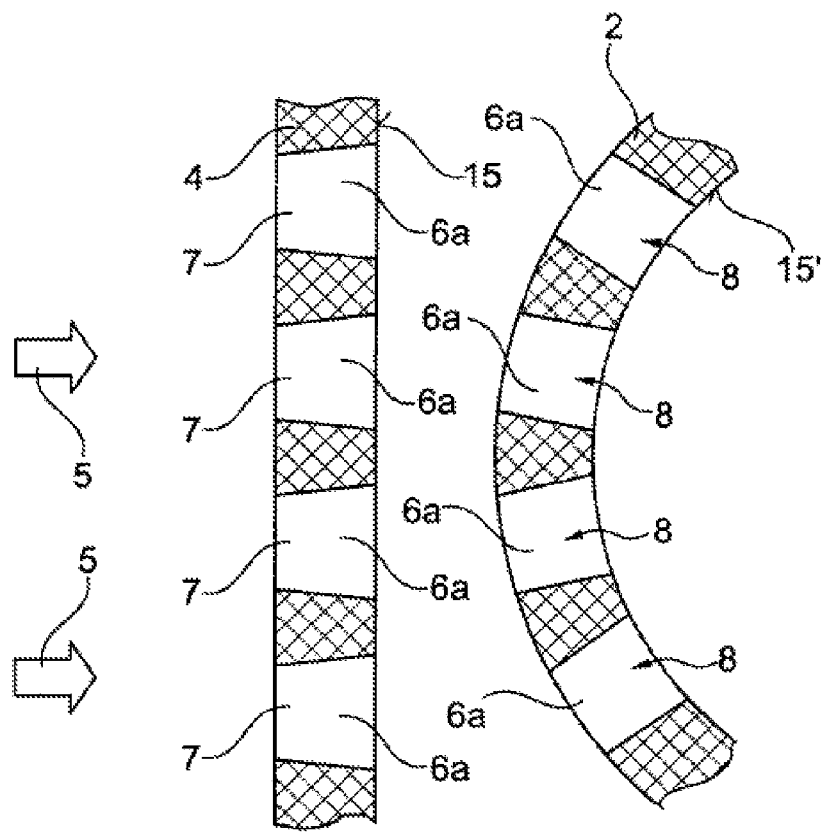
FIG. 3 shows a board of a suspension solution filter sieve basket according to the present invention in an illustration corresponding to FIG. 1.

FIG. 3 shows how the conical shape of the holes, as in the prior art, is avoided in the manner according to the present invention, and instead the advantageous conical shape of the holes is achieved in boards 2 of suspension solution filter sieve baskets according to the present invention. The holes 6a are already of conical form in the still unbent board 4 illustrated on the left in FIG. 3. They are drilled conically into the unbent board 4 in such a way that they widen toward the side 15 which, after bending, forms the inside 15' of the suspension solution filter sieve basket. The opening angle of the conical holes 8 in the still unbent board 4 is in this case so large that the conical shape of the holes which widens toward the side 15 (which, after bending forms the inside 15' of the suspension solution filter sieve basket) is maintained even after the bending of the board, as may be gathered from the right illustration of FIG. 3. The inside of the suspension solution filter sieve basket 15' is the downstream side of the suspension solution filter sieve basket. The mean diameter of the holes 7 amounts to about 20 mm to 25 mm.

Figure 4:
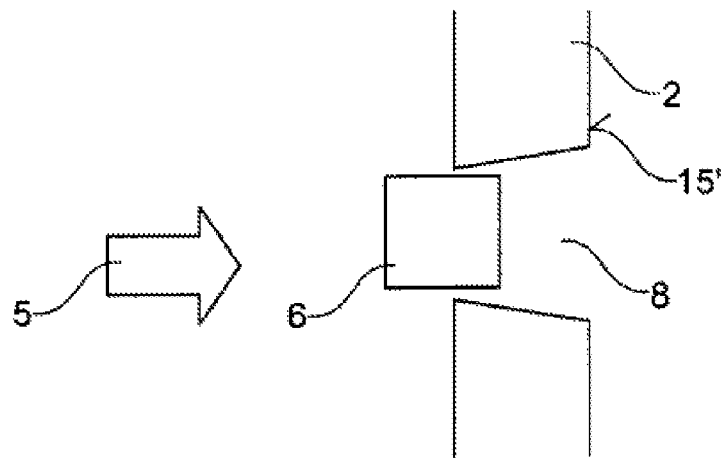
FIG. 4 shows the passage of a solid through a hole of a board, as illustrated on the right in FIG. 3.
Figure 5:
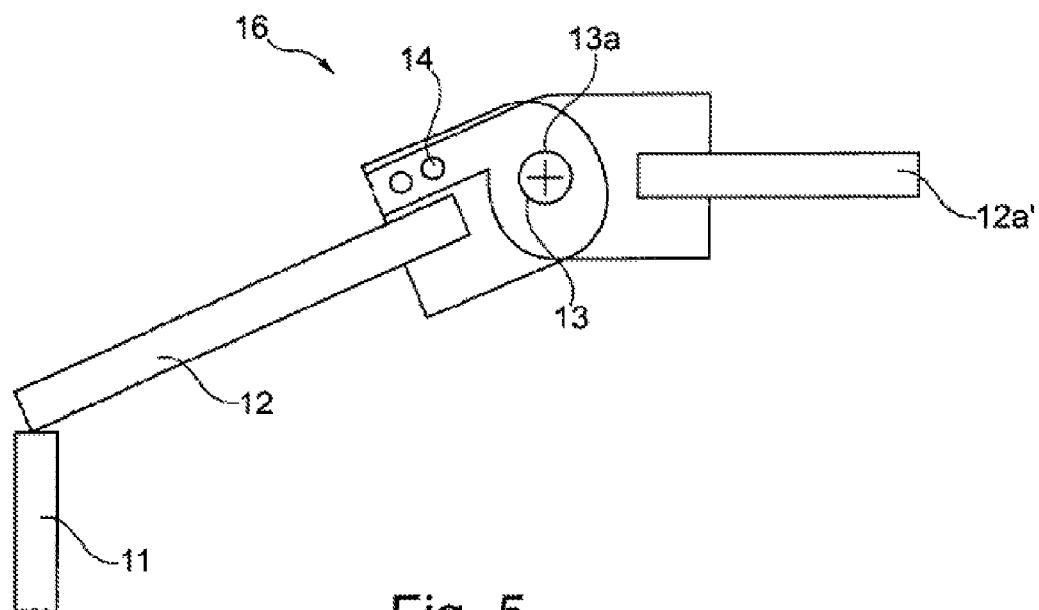
FIG. 5 shows a side illustration of an upper region of a suspension solution filter sieve basket according to the present invention with a sieve basket cover which has a predetermined breaking point.

FIG. 4 shows that the inwardly widening conical holes 8 of the bent board 2 are at least largely free of blockage. For a solid 6 is either so large that it cannot penetrate into the holes 8 or, after it has passed through the hole inlet cross section, it can easily traverse the holes through the cross section which widens further on.

FIG. 5 and FIGS. 7 to 10 show an exemplary embodiment in which the suspension solution filter sieve basket is provided with a predetermined breaking point 16. The sieve basket cover 12, in the closed state, is framed by a cover margin 12a which is firmly connected to the sieve basket body 11. The cover margin 12a comprises a straight region 12a' arranged in the rear region of the sieve basket and a semi-annular region 12a" arranged in the front region of the sieve basket. The sieve basket cover 12 is connected pivotably to the straight region 12a' by means of three basic joints 13, 13', 13". The basic joints 13, 13', 13" are operatively connected to ribs 18, 18', 18" or comprise ribs 18, 18', 18" which extend partially above the cover 12 and partially below the cover 12. Three supports 17, 17', 17" are provided on the semi-annular region 12a" of the cover margin 12a. Each support 17, 17', 17" comprises a vertical plate-shaped element 19, 19', 19" which is fastened to the semi-annular region 12a". Each plate-shaped element is pierced by a projecting breaking bolt 16a which is formed by a PP screw 16b. The ribs 18, 18', 18" which extend over at least virtually the entire cover depth lie on the PP screws 16b. When the load on the sieve basket cover 12 overshoots the maximum value, the breaking bolts shear off and the sieve basket cover 12 gives way to the pressure and pivots inward about the basic joints 13, 13', 13". The ribs 18, 18', 18" are arranged fixedly on the cover 12. With the cover 12 closed, the plate-shaped elements 19, 19', 19" project from the cover margin 12a into recesses or slots 12b, 12b', 12b" of the cover 12 which are provided for this purpose.

Figure 6:
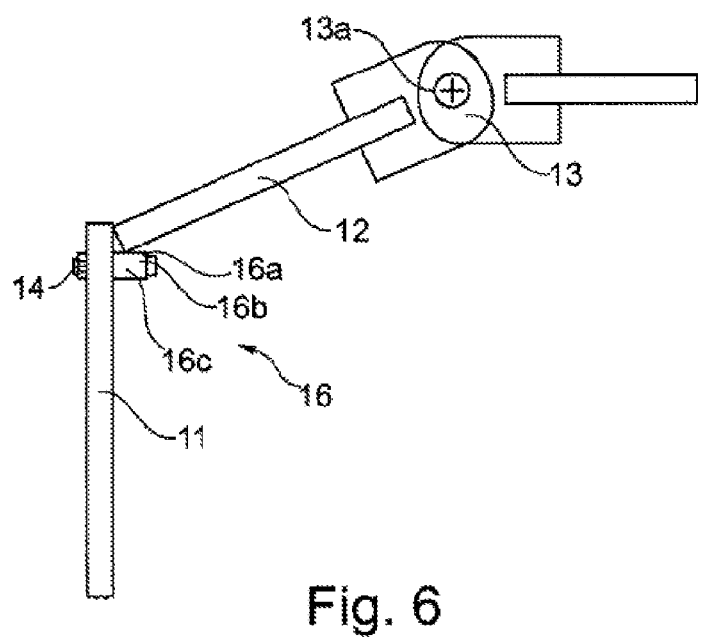
FIG. 6 shows another embodiment in a view corresponding to FIG. 5.
Figure 10:
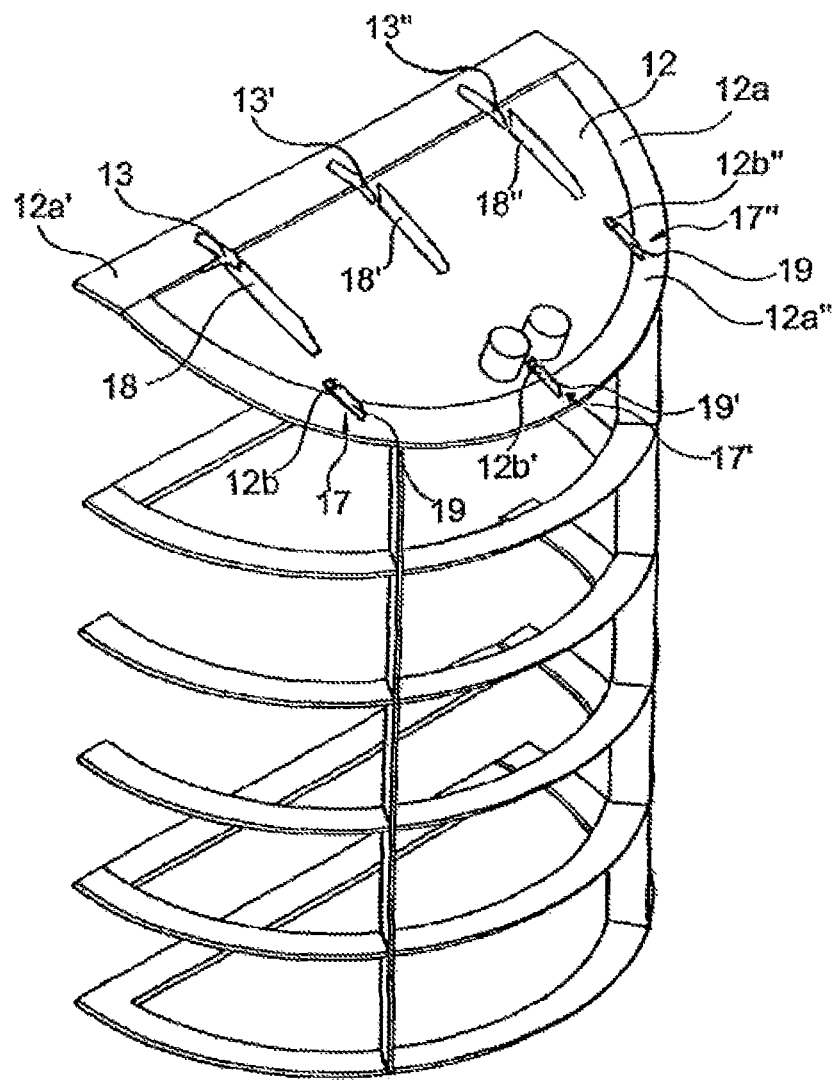
FIG. 10 shows a perspective illustration of part of a suspension solution filter sieve basket, without a board.

FIG. 6 shows a further exemplary embodiment of a suspension solution filter sieve basket equipped with a predetermined breaking point 16. The breaking bolt 16a, which forms one holding connection and is designed once again as PP screw 16b, is arranged opposite the basic joint 13, which forms a second holding connection, on the sieve basket body 11. The sieve basket cover 12 lies on the breaking bolt 16a. The breaking bolt 16a thus forms a support 16c for the sieve basket cover 12. When a maximum pressure exerting load on the sieve basket cover is exceeded, the PP screw 16b shears off and the sieve basket cover 12 pivots inward about the basic joint 13. Three basic joints 13 and three supports 16c may be provided.

In both outlined exemplary embodiments of the predetermined breaking point 16, it is thus ensured that, after the "breakage" of the predetermined breaking point 16, the sieve basket cover is held on the suspension solution filter sieve basket and cannot penetrate into the pump. Outward pivoting of the cover 12, for example during a "backflush", is readily possible in both exemplary embodiments shown in FIGS. 5 to 10.

The present invention is not limited to embodiments described herein; reference should be had to the appended claims.

LIST OF REFERENCE SYMBOLS

1 Cylindrically drilled holes
2 Bent board
3 Conical holes as a result of bending
4 Board before bending
5 Direction of flow
6 Solid
6a Holes
7 Conically drilled holes
8 Conically drilled holes after bending
11 Sieve basket body
12 Sieve basket cover
12a, 12a', 12a" Cover margin
12b, 12b', 12b" Cover slots
13 Basic joint
13a Holding rod
14 Securing bolt
15 Side of the non-bent board which after bending becomes the inside of the suspension solution filter sieve basket
15' Inside of the suspension solution filter sieve basket
16 Predetermined breaking point
16a Breaking bolt
16b PP Screw
16c Support
17, 17', 17" Supports
18, 18', 18" Ribs
19, 19', 19" Plate-shaped element

What is claimed is:

1. A flue gas desulfurization device comprising
at least one suspension solution filter sieve basket disposed in a suspension solution having a flow direction, the at least one suspension solution filter sieve basket comprising:
- a predetermined breaking point configured to release so as to cause a relief of a force on a sieve basket body when a suction load on the sieve basket body is exceeded;
- a sieve basket cover disposed on an upper side of the at least one suspension solution filter sieve basket, wherein, after the release, the predetermined breaking point results at least a partial opening of at least a part of the sieve basket cover; and
- holes, wherein,
- the least one suspension solution filter sieve basket, upon a breakage at the predetermined breaking point and the partial opening of at least a part of the sieve basket cover, acts as a grid so that a mass of solids is retained and only a part of the solids flow therethrough.

2. The flue gas desulfurization device as recited in claim 1, wherein the suspension solution filter sieve basket further comprises a semicircular region or a semi-oval region, the holes being arranged in the semicircular region or in the semi-oval region.

3. The flue gas desulfurization device as recited in claim 1, further comprising a connection device which is configured to remain connected to the suspension solution filter sieve basket after the release of the predetermined breaking point results in the at least a partial opening of at least a part of the sieve basket cover.

4. The flue gas desulfurization device as recited in claim 1, wherein the sieve basket cover includes two holding connections, wherein a weaker holding connection is configured to act as the predetermined breaking point.

5. The flue gas desulfurization device as recited in claim 1, wherein the sieve basket body includes a support on which the sieve basket cover is mounted, the support being fastened so that the support is sheared off when a specific load is reached.

6. The flue gas desulfurization device as recited in claim 1, wherein the holes widen in the flow direction in a conical shape.

7. The flue gas desulfurization device as recited in claim 1, wherein the suspension solution filter sieve basket further comprises a board bent as a semicircle or as a semi-oval, wherein the holes are arranged in the board.

8. The flue gas desulfurization device as recited in claim 7, wherein the board has a wall thickness of about 15 to 20 mm.

9. The flue gas desulfurization device as recited in claim 1, wherein the suspension solution filter sieve basket comprises a plastic.

10. The flue gas desulfurization device as recited in claim 1, wherein the suspension solution filter sieve basket comprises a thermoplastic material.

* * * * *